FIG. I.

INVENTORS
BORIS IZRAILEVICH MEDOVAR
YURY VADIMOVICH LATASH
OLEG PETROVICH BONDARENKO &
ALEXSEY GEORGIEVICH BOGACHENKO
BY
Lane, Aitken, Dunner & Ziems
ATTORNEYS

3,738,825
SYSTEM AND METHOD OF ELECTROSLAG REMELTING UTILIZING SLAB-SHAPED ELECTRODES

Boris Izrailevich Medovar, Boulevar Lesy Ukrainky 2, Apt. 8; Yury Vadimovich Latash, ul. Artema 55, Apt. 23; Oleg Petrovich Bondarenko, ul. Khreshchatic 15, Apt. 34; and Alexsey Georgievich Bogachenko, ul. Miljutenko 15/2, Apt. 141, all of Kiev, U.S.S.R.
Filed June 3, 1970, Ser. No. 43,092
Int. Cl. C22d 7/08
U.S. Cl. 75—10 C         31 Claims

ABSTRACT OF THE DISCLOSURE

In an electroslag remelting process of the type where two electrodes are immersed in a molten slag bath in a mold and AC power is applied between the electrodes, a significant power reduction is effected by the use of slab-shaped electrodes instead of conventional square-cross-section electrodes.

BACKGROUND OF THE INVENTION

This invention relates to an electroslag remelting process for the refining of metals and alloys of the type where two consumable electrodes (or groups of consumable electrodes) are immersed in a molten slag bath in a mold and AC power is applied between the electrodes (or groups of electrodes).

The system of this type of process where AC power is applied between electrodes is referred to as the bifilar system.

The system of electroslag remelting in which power is applied between the base plate of the mold and a single electrode or group of electrodes is referred to as the monophase system.

The bifilar system of electroslag remelting has significant advantages over the monophase system of electroslag remelting. Because the power is applied between two closely spaced electrodes, separation of the conductors supplying the power to the system is minimized. Accordingly, the inductance of the system is significantly reduced. As a result, the bifilar system has a lower power factor than the monophase system, and only 60 to 80% as much power is required in the bifilar system to produce a given-size ingot as is required in the monophase system. In addition, a lower power transformer can be used to produce ingots of a given size than can be used in the monophase system.

Belgian Patent No. 670,299 discloses a bifilar installation comprising a mold disposed on a bottom plate. A slag bath is prepared in the mold by any conventional method. Two consumable square horizontal cross-section electrodes or two groups of such electrodes are immersed into this bath. The electrodes are connected in series to the secondary winding of a single-phase power transformer employed as a power supply source for the installation. The electrodes are moved downwardly during the operation by a single feeding mechanism so as to be progressively melted in the slag bath.

No prior art is known to disclose the use of other than square-cross-section electrodes in a bifilar process, or that variation in electrode shape affects efficiency in a bifilar process. These are key unobvious elements of the present invention.

SUMMARY OF THE INVENTION

It has been discovered in the present invention that in an electroslag remelting process of the type where two electrodes or two groups of electrodes are immersed in a molten slag bath in a mold and AC power is applied between the electrodes or groups of electrodes, a significant power reduction is effected by the use of slab-shaped electrodes instead of conventional square-cross-section electrodes. The power reduction ordinarily ranges from about 15% to about 25%. This power reduction is due at least in part to the electrode configuration providing an improved power factor. The term "slab-shaped electrode" is utilized herein to mean an electrode having a rectangular horizontal cross-section. Preferably, the rectangular cross-section has a width-to-thickness ratio of at least about 5, and optimally at least about 6.28, the width being the long dimension and the thickness being the short dimension.

Thus, the electroslag remelting system of the present invention comprises a mold for forming an ingot under a bath of molten slag, said mold including sidewalls and a bottom plate; at least two slab-shaped electrodes disposed in said mold so that the width dimension of one electrode is parallel to the width dimension of a companion electrode; means for positioning said electrodes in said mold immersed in the molten slag bath within said mold; and means for applying AC power between said electrodes to cause electric current to flow between said electrodes through said molten slag bath.

It has further been discovered herein that the aforedescribed process is more advantageously carried out utilizing a particular relationship between mold size and electrode size and utilizing a particular manner of positioning electrodes within the mold. This size and positioning relationship is also advantageous when other than slab-shaped electrodes, for example, square cross-section or tubular electrodes, are utilized.

It has also been discovered herein that the aforedescribed process is more advantageously carried out when particular slag and ingot dimension limitations and relationships are utilized.

BRIEF DESCRIPTION OF THE DRAWINGS

Possible embodiments of the invention will now be described by way of example with reference to the accompanying drawings, wherein.

DETAILED DESCRIPTION OF THE INVENTION

Figure 1:
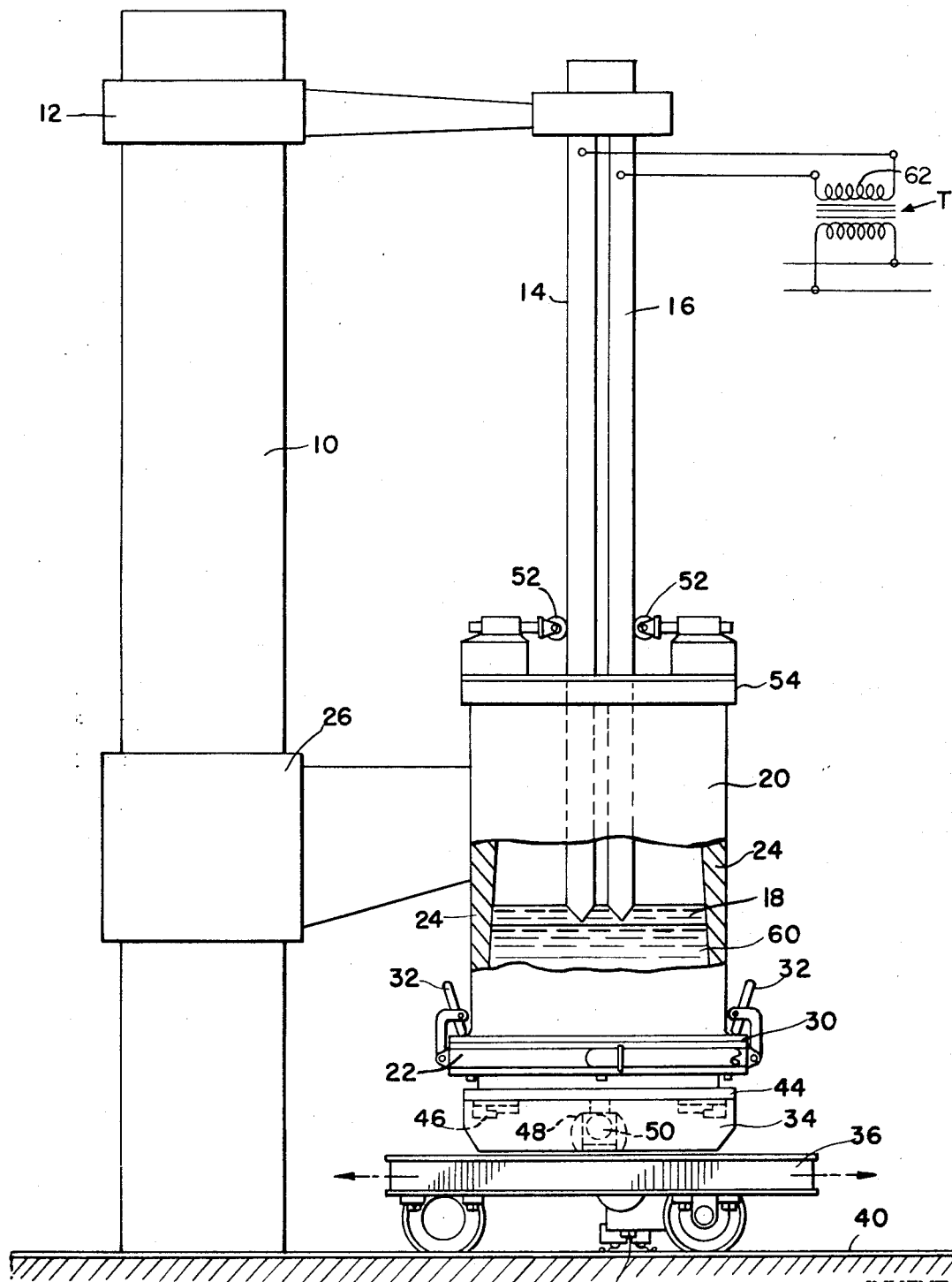
FIG. 1 represents a side elevational view of an installation for the electroslag remelting according to the invention.
Figure 2:
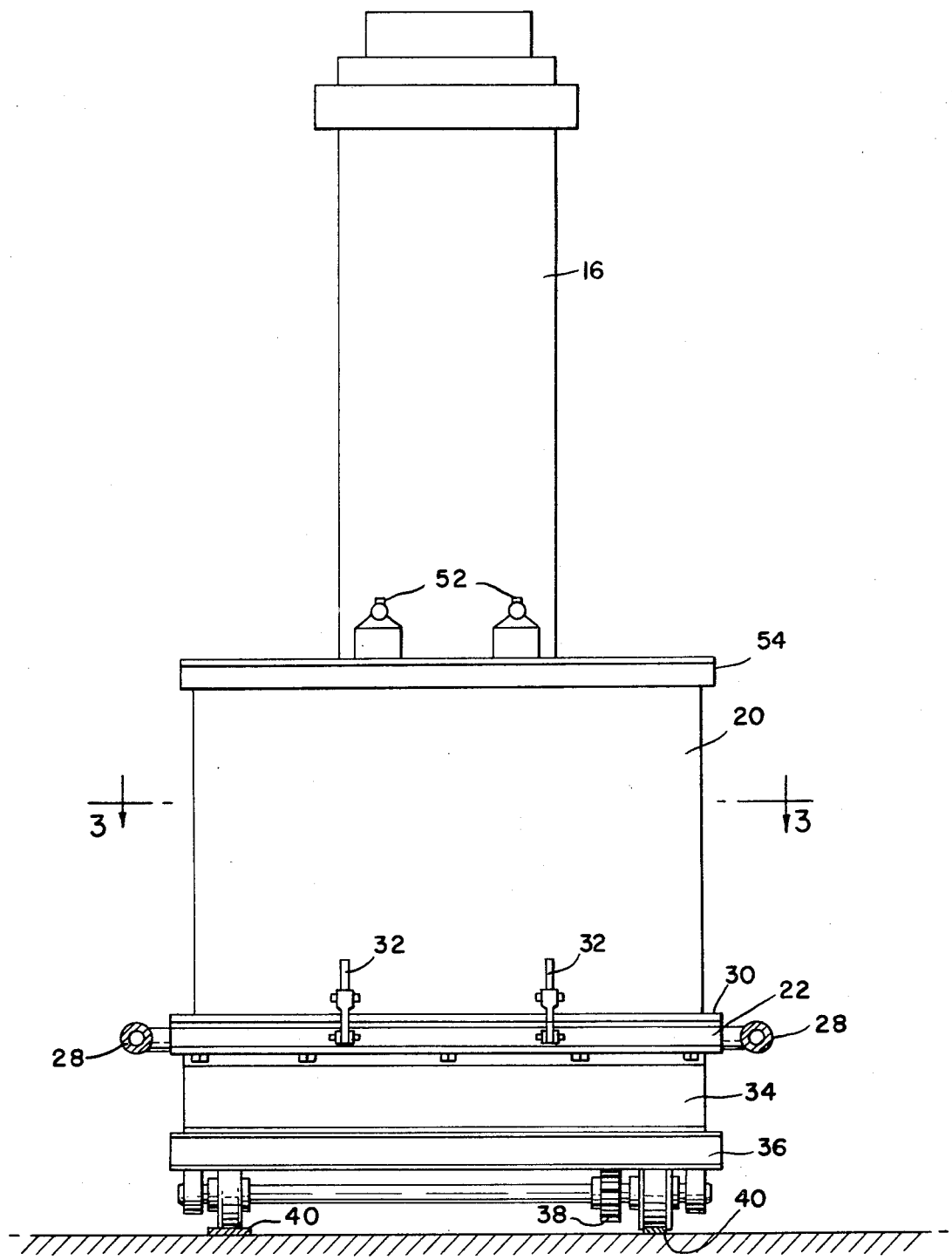
FIG. 2 represents a front elevational view of the installation of FIG. 1.
Figure 3:
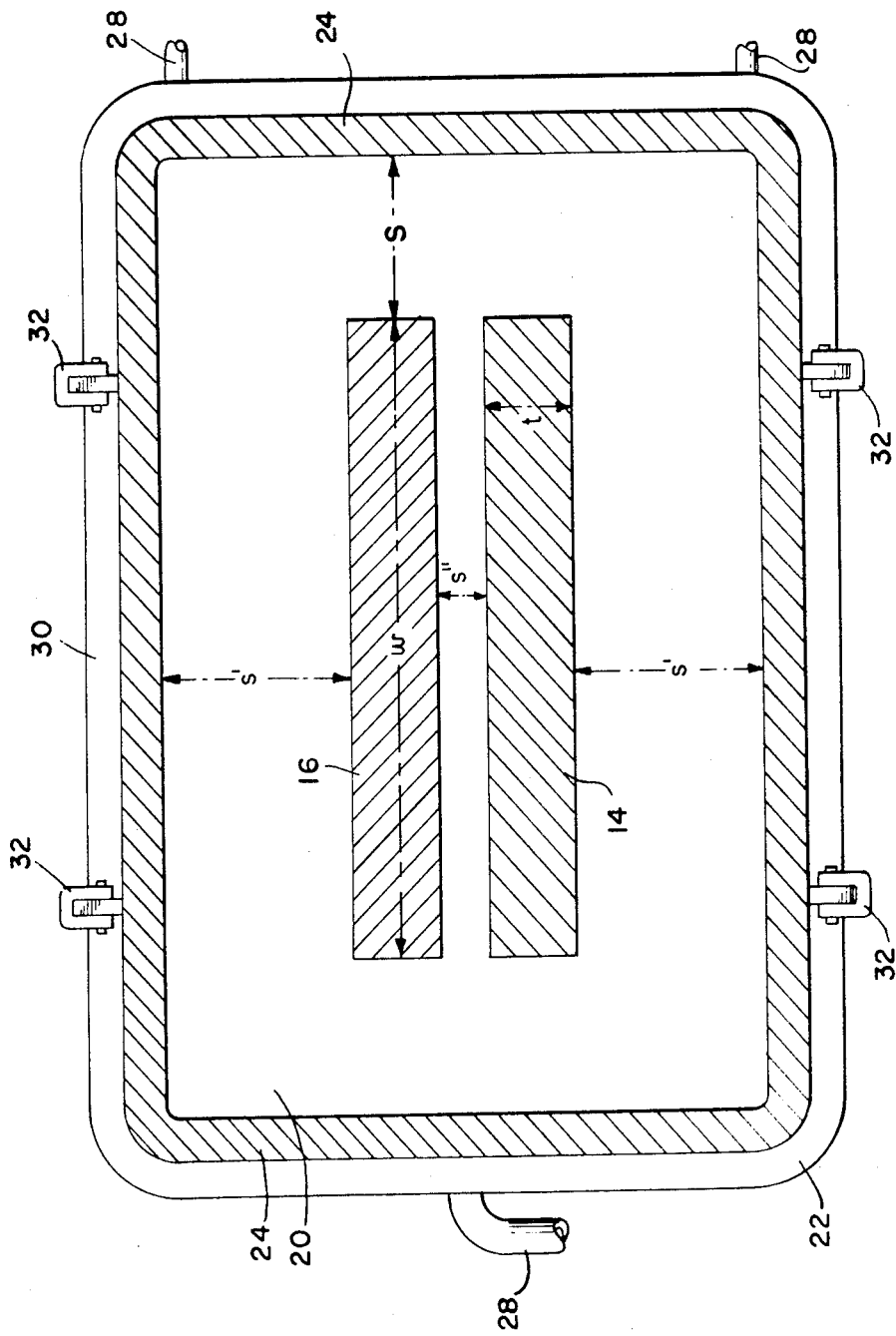
FIG. 3 is a cross-sectional view along the line 3—3 of FIG. 2 depicting the horizontal cross-section of the mold sidewalls and the horizontal cross-section of the electrodes disposed within the mold.

In the embodiment of the invention represented in FIGS. 1–3, the installation is provided with a supporting column 10 mounting a mechanism 12 for feeding electrodes 14 and 16, to be introduced simultaneously into a slag bath 18, as prepared in a mold intended for shaping an ingot (not depicted) built up from the melting of electrodes 14 and 16.

The mold 20 comprises a bottom plate 22 on which are placed sidewalls 24. The sidewalls 24 are connected with a lifting mechanism 26 mounted on column 10. The bottom plate 22 contains a cooling means 28. The sidewalls 24 are provided with an outwardly extending flange 30 which rests on bottom plate 22. Clamps 32 are mounted on the bottom plate 22 around the mold to firmly press the flange 30 down against the bottom plate.

The bottom plate 22 is positioned on a support 34 which in turn is supported on a dolly 36 which is driven by an electric motor (not shown) and a transmission including gear 38 along tracks 40 having a trolley connection 42 to move the mold horizontally in one direction. The support 34 comprises a top plate 44 which is movable along guideways 46 as driven by means of a nut 48 affixed to top plate 44 and threaded on a screw 50 whereby top plate 44 can be moved so as to move the mold 20 in a horizontal direction perpendicular to the direction of movement provided by the dolly 36.

The electrodes 14 and 16 are slab-shaped and are disposed in mold 20 with their width dimensions parallel. They are connected to the opposite sides of the output 62 of a single-phase power transformer T, which is the power supply source of the installation. Rollers 52 are mounted on a support 54 which is positioned on top of the mold 20 so as to prevent the electrodes 14 and 16 from contacting the sidewalls 24.

The electrodes 14 and 16 are symmetrically positioned within the mold 20 by the use of the afordescribed mechanisms for moving the mold 20 in two horizontal directions. Power is then supplied to the electrodes 14 and 16, and molten slag is poured into the mold so as to contact the bottom of the electrodes. As soon as this contact is made, the circuit between the electrodes is completed, whereby melting of the electrodes is caused to occur. After melting has been initiated, the electrodes are fed simultaneously downwardly into the slag by mechanism 12, whereby the ends of the electrodes are kept immersed in the molten slag and the electrodes are progressively melted. As the electrodes melt, the liquid metal forms into drops on the electrodes which fall off into the slag bath 18. The liquid metal passes through the slag bath 18 and forms a molten pool 60 beneath the bath. The bottommost portion of the molten pool 60 progressively solidifies, building up an ingot. The slag refines the liquid metal and as a result an ingot of high quality is formed in the mold. As a result of the slab-shaped configuration of the electrodes, the power required for the process is substantially reduced compared to where electrodes of square-cross-section are utilized, as shown in the example hereinafter.

It was noted hereinbefore that certain electrode dispositions and spacings offer significant advantages with respect to efficient operation. More particularly, it has been discovered that certain relationships between electrodes and between the electrodes and the mold sidewalls should be maintained in order to assure the achievement of production of ingots of high quality with high efficiency and with minimum time and cost.

The aforementioned relationships include (a) the relationship between the distance between electrodes and the minimum distance from an electrode surface to a mold sidewall, (b) the spacing between the electrodes, and (c) the fill ratio (defined hereinafter).

The distance between the electrodes should be equal to, or smaller than the minimum distance from an electrode surface to a mold sidewall.

The spacing between juxtaposed electrodes advantageously is at least about 5 mm., with about 150 mm. being optimum.

The fill ratio is the ratio of the portion of the mold horizontal cross-section filled by the electrodes when they are in place to the total mold horizontal cross-section.

As indicated by reference to FIG. 3, the fill ratio is represented by the formula $$\frac{2tw}{2(s \times [2s^1 + 2t_1 + s^{11}]) + 2s^1 w + s^{11} w + 2tw}$$

with $s$, $s^1$, $s^{11}$, $t$ and $w$ as defind in FIG. 3, and assuming that two electrodes are utilized, that each has the same dimensions, and that the electrodes are symmetrically positioned within the mold.

The fill ratio advantageously ranges from about 0.3 to about 0.66 with a fill ratio at least about 0.35 being preferred.

It is preferred that the dimensions and dispositions of the electrodes be such as to provide a maximum fill ratio while meeting the aforementioned limitations with respect to spacing between electrodes and relationship between the distance between electrodes and the minimum distance from an electrode surface to a mold sidewall.

Mold and electrode dimensions providing ratios and spacings with the aforementioned limitations when two such electrodes are symmetrically disposed in a mold are shown in the following table:

| Cross-section dimensions (mm.) of— | |
|---|---|
| Electrode horizontal | Mold horizontal |
| 1,230 x 140 | 1,430 x 630 |
| 1,120 x 140 | 1,340 x 630 |
| 880 x 140 | 1,100 x 630 |

It has also been discovered herein that it is advantageous from an efficiency standpoint to utilize a slag depth of $250 \pm 15$ mm., and an ingot width to thickness ratio of at least about 1.7. For purposes of this description and the claim terminology whenever reference is made to width and thickness of electrode or ingot, the width is the long horizontal cross-section dimension and the thickness is the short horizontal cross-section dimension.

Figure 4:
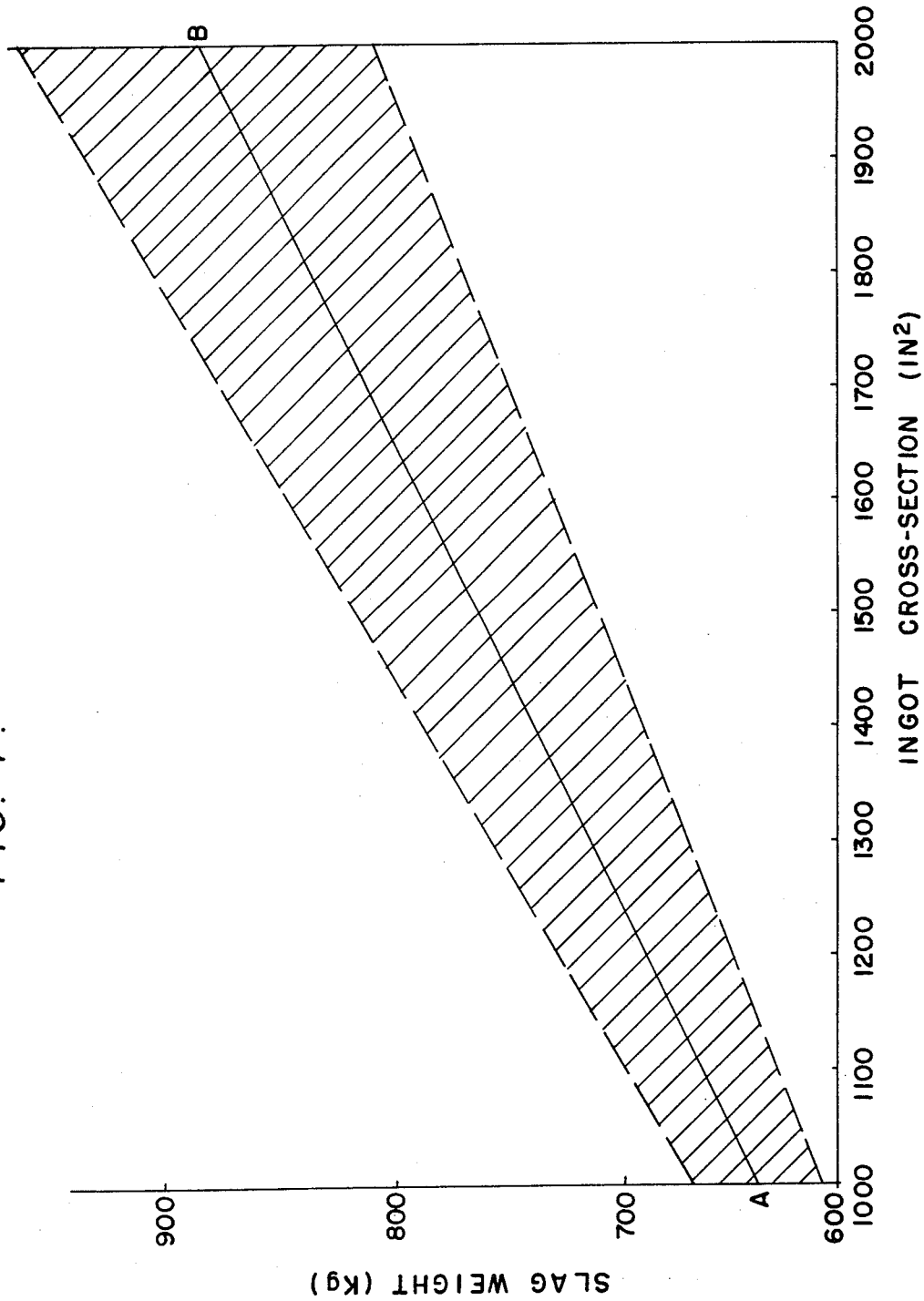
FIG. 4 is a graph defining a preferred relationship between slag weight and ingot size.
Figure 5:
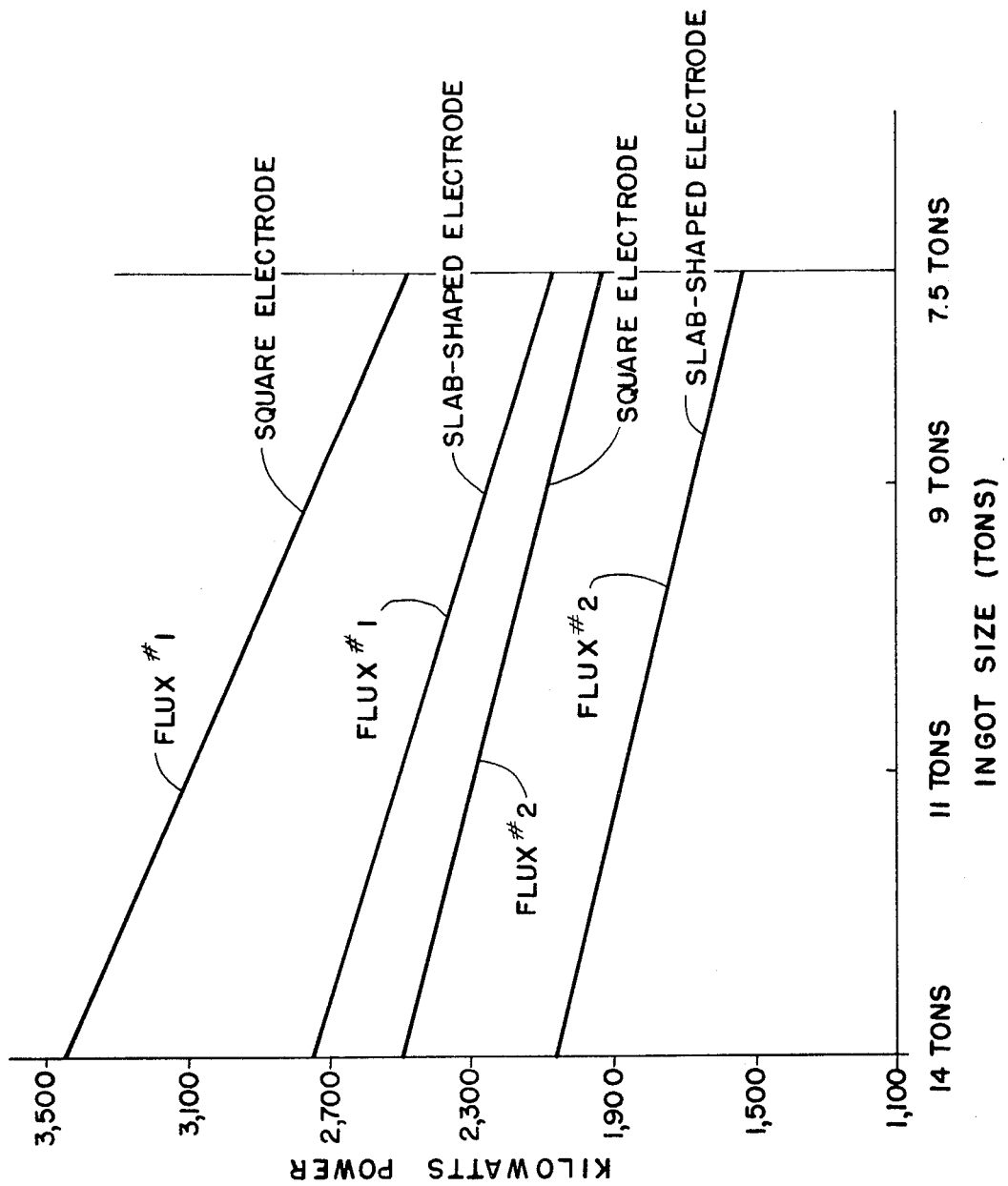
FIG. 5 is a graph of power vs. ingot size showing the advantage from a power standpoint of slab-shaped electrodes over square cross-section electrodes.

A preferred relationship between the weight of slag utilized and refined ingot size is shown by the shaded area in FIG. 4, with an optimum relationship defined by the line A–B of FIG. 4.

The present invention is further illustrated in the following example wherein the advantage from a power standpoint of slab-shaped electrodes over square-cross-section electrodes is shown:

EXAMPLE

A series of runs was carried out where steel was refined in a bifilar electroslag remelting process. A slag depth of 250 mm. was utilized In the runs the electrode size and mold size were varied, and the power necessary to refine a given-weight ingot was measured. Runs were carried out utilizing a flux low in alumina content denoted flux No. 1, and a flux high in alumina content denoted flux No. 2. Flux No. 1 had a chemical composition consisting by weight of 50–60% $CaF_2$, 10–15% CaO, 12–20% $Al_2O_3$, 10–15% MgO, 2–7% $SiO_2$, 0.3% FeO, 0.05% P, and 0.05% S. Flux No. 2 had a chemical composition consisting by weight of 60–70% $CaF_2$, 2–8% CaO, 26–32% $Al_2O_3$, 1% $SiO_2$, 0.3% FeO, 0.05% P, and 0.05% S. The results achieved are shown in graph form in FIG. 5. As shown in FIG. 5, 15–25% less power was required to produce a given-size ingot when slab-shaped electrodes were utilized, as compared to square-cross-section electrodes.

The invention may be embodied in other specific forms without departing from the spirit or the essential characteristics thereof. The present embodiments are therefore to be considered in all respects as illustrative and not restrictive, the scope of the invention being indicated by the appended claims rather than by the foregoing description, and all changes that come within the meaning and range of equivalency of the claims are therefore intended to be embraced therein.

What is claimed is:

1. A bifilar electroslag remelting system comprising a mold for forming a rectangular cross-section ingot under a bath of molten slag, said mold including side walls and a bottom plate; a plurality of consumable metal electrodes, each having a companion electrode, for connection in a bifilar circuit arrangement comprising at least two companion electrodes substantially similar in horizontal cross-section which is substantially of rectangular shape disposed in depending spaced apart side by side relationship into said mold with the broad faces of companion electrodes facing each other in parallel relationship and parallel to the longer dimension of the mold lateral cross-section; means for positioning said companion electrodes spaced away from said mold sidewalls and with their lower ends disposed so they will be immersed in a molten slag bath within said mold and so that the molten slag will occupy all of the space immediately between the immersed ends of said companion electrodes, and the distance between the immersed ends of said companion electrodes is no greater than the minimum distance from an electrode to a mold sidewall; and means for applying single phase AC electric power between said electrodes to cause current to flow between said electrodes through said molten slag bath.

2. An electroslag remelting system as recited in claim 1 wherein the spacing between electrodes is at least about 5 mm.

3. An electroslag remelting system as recited in claim 2, wherein the fill ratio ranges from about 0.3 to about 0.66.

4. A bifilar electroslag remelting system comprising a mold for forming an ingot under a bath of molten slag, said mold including side walls and a bottom plate; a plurality of consumable metal electrodes, each having a companion electrode, for connection in a bifilar circuit arrangement comprising at least two slab-shaped companion electrodes substantially similar in horizontal cross-section and the broad faces of each electrode being substantially parallel, said electrodes being disposed in depending spaced apart side by side relationship into said mold so that the width dimensions of said two slab-shaped companion electrodes are substantially parallel and so that their facing surfaces are substantially parallel broad faces; said electrodes having a total lateral cross section area which in relation to the lateral cross section area of the interior of the mold provides a fill ratio no greater than about 0.66; means for positioning said companion electrodes spaced away from said mold side walls and so their lower ends will be immersed in a molten slag bath within said mold and so that the molten slag will occupy all of the space immediately between the immersed ends of said companion electrodes; and means for applying single phase AC electric power between said electrodes to cause current to flow between said electrodes through the molten slag bath.

5. An electroslag remelting system as recited in claim 4, wherein the width-to-thickness ratio of each slab-shaped electrode is at least about 5.

6. An electroslag remelting system as recited in claim 5, wherein the width-to-thickness ratio of each slab-shaped electrode is at least about 6.28.

7. An electroslag remelting system as recited in claim 4, wherein the distance between companion electrodes is equal to or smaller than the minimum distance from a electrode to a mold sidewall.

8. An electroslag remelting system as recited in claim 7, wherein the dimensions and dispositions of the electrodes are such as to provide the maximum fill ratio.

9. An electroslag remelting system as defined in claim 7, wherein said mold has inside dimensions to provide a formed ingot having a width-to-thickness ratio of at least about 1.7.

10. An electroslag remelting system as recited in claim 7, wherein the width-to-thickness ratio of each slab-shaped electrode is at least about 5.

11. An electroslag remelting system as recited in claim 10, wherein the width-to-thickness ratio of each slab-shaped electrode is at least about 6.28.

12. An electroslag remelting system as recited in claim 7, wherein the fill ratio is at least about 0.3.

13. An electroslag remelting system as recited in claim 12, wherein the fill ratio is at least about 0.35.

14. An electroslag remelting system as defined in claim 12, wherein said mold has inside dimensions to provide a formed ingot having a width-to-thickness ratio of at least about 1.7.

15. An electroslag remelting system as recited in claim 7, wherein the spacing between electrodes is at least about 5 mm.

16. An electroslag remelting system as recited in claim 15, wherein the spacing between electrodes is about 150 mm.

17. An electroslag remelting system as recited in claim 15, wherein the fill ratio is at least about 0.3.

18. An electroslag remelting system as recited in claim 17, wherein the fill ratio is at least about 0.35.

19. An electroslag remelting system as recited in claim 17, wherein the dimensions and dispositions of the electrodes are such as to provide a maximum fill ratio.

20. An electroslag remelting process comprising the steps of immersing the lower end portions of a plurality of consumable metal electrodes, each having a companion electrode, in a molten slag bath in a mold and applying single phase AC electric power in bifilar circuit arrangement between the companion electrodes, melting the slab-shaped electrodes of substantially rectangular cross-section in which the total area of electrode rectangular cross-sections has a relationship to the area of the interior lateral cross-section of the mold to provide a fill ratio no greater than about 0.66, disposing the electrodes side by side and spaced apart in the mold so that the width dimension of one electrode is parallel to the width dimension of a companion electrode and the broad sides of the electrodes are in facing relationship, and assuring that molten slag occupies the entire space immediately between the imersed end portions of companion electrodes, during the remelting process.

21. An electroslag remelting process as recited in claim 20, wherein the mold is selected so an ingot is formed having a width-to-thickness ratio of at least about 1.7.

22. An electroslag remelting process as recited in claim 20, wherein electrodes are selected so that the fill ratio ranges from about 0.3 to about 0.66.

23. An electroslag remelting process as recited in claim 20, wherein the spacing between said electrodes is made at least about 5 mm.

24. An electroslag remelting process as recited in claim 20, wherein electrodes are selected so that the width-to-thickness ratio of each slab-shaped electrode is at least about 5.

25. An electroslag remelting process as recited in claim 24, wherein electrodes are selected so that the width-to-thickness ratio of each slab-shaped electrode is at least about 6.28.

26. A process as recited in claim 20, wherein the distance between said electrodes is made equal to or smaller than the minimum distance from an electrode surface to a mold sidewall.

27. An electroslag remelting process as recited in claim 26, wherein the spacing between said electrodes is made at least about 5 mm.

28. An electroslag remelting process as recited in claim 27, wherein electrodes are selected so that the fill ratio ranges from about 0.3 to about 0.66.

29. An electroslag remelting process as recited in claim 28, wherein electrodes are selected so that the width-to-thickness ratio of each slab-shaped electrode is at least about 5.

30. An electroslag remelting process as recited in claim 29, wherein electrodes are selected so that the width-to-thickness ratio of each slab-shaped electrode is at least about 6.28.

31. An electroslag remelting process as recited in claim 29, wherein the mold is selected so an ingot is formed having a width-to-thickness ratio of at least about 1.7.

References Cited

UNITED STATES PATENTS

| | | | |
|---|---|---|---|
| 3,379,238 | 4/1968 | Sieckman | 164—52 X |
| 3,080,499 | 3/1963 | Cooper | 13—18 X |
| 3,493,364 | 2/1970 | Nakanishi | 75—12 |

FOREIGN PATENTS

| | | | |
|---|---|---|---|
| 1,117,202 | 6/1968 | Great Britain | 75—12 |

WINSTON A. DOUGLAS, Primary Examiner

M. J. ANDREWS, Assistant Examiner

U.S. Cl. X.R.

75—12; 13—18; 164—52, 252